United States Patent Office 3,570,263
Patented Mar. 16, 1971

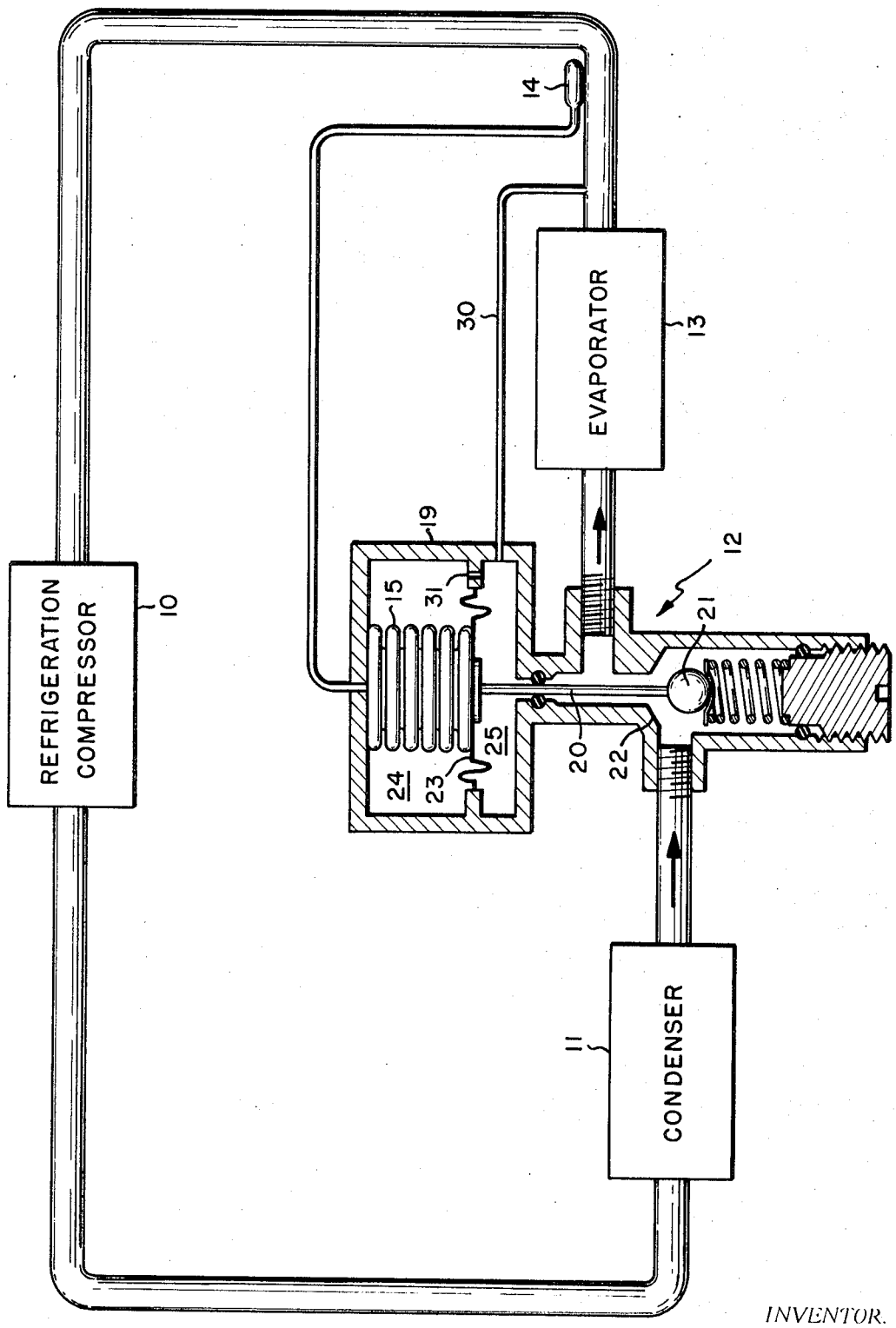

3,570,263
THERMAL EXPANSION VALVE WITH FEEDBACK
FOR STABILIZING A REFRIGERATION SYSTEM
James R. Tobias, Minneapolis, Minn., assignor to
Honeywell Inc., Minneapolis, Minn.
Filed Apr. 28, 1969, Ser. No. 819,848
Int. Cl. F25b 41/04
U.S. Cl. 62—211                                          4 Claims

ABSTRACT OF THE DISCLOSURE

A thermal expansion valve for a refrigeration system having a temperature bulb for responding to superheat and an external equalizer with means associated with the temperature and pressure responsive portions of the actuator valve for temporarily offsetting some of the effect of the superheat upon a change in evaporator pressure to stabilize the refrigeration system.

SUMMARY OF THE INVENTION

The present invention is concerned with a thermal expansion valve having temperature responsive means responsive to superheat and a pressure responsive means for external equalization. The pressure responsive portion of the control actuator of the valve can temporarily offset the effect of the temperature responsive portion upon a change in evaporator pressure to stabilize the refrigeration system.

DESCRIPTION OF THE INVENTION

Referring to the single figure, a conventional refrigeration system is shown having a refrigeration compressor 10, a condenser 11, a thermal expansion valve 12 and an evaporator connected in series. The thermal expansion valve has a temperature responsive bulb 14 mounted on the outlet of the evaporator to respond to superheat. Bulb 14 is connected to a bellows 15 in the control actuator or head 19 of valve 12. The lower end of bellows 15 is connected by a shaft 20 to a ball 21 which is spring biased upward and can move against a valve seat 22 for closing the valve. Attached to the lower end of bellows 15 is a pressure responsive means or diaphragm 23 separating an upper chamber 24 from a lower chamber 25 in the control head 19. An external equalizer connection 30 is made between the outlet of the evaporator and lower chamber 25 so the outlet pressure of the evaporator is applied to the underside of diaphragm 23 to apply a force against bellows 15. Interconnecting chambers 24 and 25 is an orifice or opening 31 to provide for restricted flow of refrigerant gas between chamber 24 and 25.

The dimensions of bellows 15 are such that during normal operation valve 12 operates as a conventional thermal expansion valve to control the superheat and provide for external equalization. In order to apply stability to the system upon changes in the flow of refrigerant through valve 12, a change in the pressure in chamber 25 results in a temporary additional bias or feedback for offsetting of the effect of bellows 15 until the pressure in the upper and lower chamber can equalize through orifice 31.

During normal operation of the refrigeration system, the flow of refrigerant through valve 12 is maintained such that the superheat or temperature at bulb 14 is maintained at some predetermined value. As the pressure drop through the evaporator changes, external equalization is provided; however, any sudden change in pressure downstream of the evaporator would have a temporary additional bias effect to temporarily offset or reset a portion of the superheat signal from bulb 14. For example, upon a change in load condition to result in an increase in superheat the refrigerant flow is increased as valve 12 opens; however, the additional pressure in the evaporator limits the valve position. As soon as the the refrigerant leaks through opening 31 into chamber 24 to equalize the pressure in chamber 24 and 25, valve 12 opens to a normal position depending upon the superheat and the normal external equalizer pressure.

The embodiments of the invention in which an exclusive property or right is claimed are defined as follows:

1. In a thermal expansion valve for a refrigeration system comprising;
   valve means adapted to control the flow of refrigerant to an evaporator of the refrigeration system,
   temperature responsive means connected to said valve means, said temperature responsive means adapted to respond to a temperature indicative of the superheat of the evaporator for normally opening said valve when the superheat temperature increases,
   pressure responsive means connected to said valve means, said pressure responsive means responsive to a pressure in the refrigeration system for normally closing said valve means when the pressure increases to offset a portion of the effect of said temperature responsive means on said valve means, and
   means associated with the pressure and temperature responsive means when said pressure responsive means responds to an increase in pressure to temporarily offset a great portion of the effect of said temperature responsive means to stabilize the system.

2. The invention of claim 1 wherein said valve means has an actuator with said temperature responsive means comprising a bellows connected to a remote bulb, said pressure responsive means comprising a diaphragm connected to the underside of the bellows, an enclosure having an upper and lower chamber with the diaphragm separating said upper chamber containing the bellows and said lower chamber, and said means associated with said pressure and temperature responsive means comprising a restrictive opening between said upper and lower chamber so that the pressures in the upper and lower chambers can equalize.

3. The invention of claim 2 wherein the effective surface area of the diaphragm in said upper chamber is less than the surface area of the diaphragm in said lower chamber.

4. The invention of claim 1 wherein said temperature responsive means has a remote bulb adapted to be responsive to superheat and said pressure responsive means has a fluid connection adapted to respond to the pressure of the evaporator as an external equalizer.

References Cited

UNITED STATES PATENTS 596,601    1/1898    Knox _____ 236—92

MEYER PERLIN, Primary Examiner

U.S. Cl. X.R.

62—225